(12) United States Patent
Ciscon et al.

(10) Patent No.: US 10,933,585 B2
(45) Date of Patent: Mar. 2, 2021

(54) THREE-DIMENSIONAL PRINTER

(71) Applicant: NORTHWORKS AUTOMATION, INC., Houston, TX (US)

(72) Inventors: Lawrence Ciscon, Houston, TX (US); James D. Wise, Houston, TX (US)

(73) Assignee: Northworks Automation, Inc., Houston, TX (US)

( * ) Notice: Subject to any disclaimer, the term of this patent is extended or adjusted under 35 U.S.C. 154(b) by 0 days.

(21) Appl. No.: 15/713,519

(22) Filed: Sep. 22, 2017

(65) Prior Publication Data
US 2019/0030807 A1  Jan. 31, 2019

Related U.S. Application Data

(63) Continuation-in-part of application No. 15/659,433, filed on Jul. 25, 2017.

(51) Int. Cl.
| | |
|---|---|
| *B29C 64/245* | (2017.01) |
| *B29C 64/393* | (2017.01) |
| *B33Y 50/02* | (2015.01) |
| *B33Y 40/00* | (2020.01) |
| *B29C 64/379* | (2017.01) |
| *B29C 64/209* | (2017.01) |
| *B33Y 30/00* | (2015.01) |
| *B29C 64/232* | (2017.01) |
| *B29C 64/386* | (2017.01) |
| *B33Y 50/00* | (2015.01) |
| *B29C 64/112* | (2017.01) |
| *B29C 64/106* | (2017.01) |
| *B29C 64/20* | (2017.01) |

(52) U.S. Cl.
CPC .......... *B29C 64/245* (2017.08); *B29C 64/209* (2017.08); *B29C 64/379* (2017.08); *B29C 64/393* (2017.08); *B33Y 30/00* (2014.12); *B33Y 40/00* (2014.12); *B33Y 50/02* (2014.12); *B29C 64/106* (2017.08); *B29C 64/112* (2017.08); *B29C 64/20* (2017.08); *B29C 64/232* (2017.08); *B29C 64/386* (2017.08); *B33Y 50/00* (2014.12)

(58) Field of Classification Search
CPC ... B29C 64/245; B29C 64/379; B29C 64/209; B29C 64/393; B29C 64/20; B33Y 30/00; B33Y 40/00; B33Y 50/02; B33Y 50/00
USPC ...................... 425/162, 375, 174.4
See application file for complete search history.

(56) References Cited

U.S. PATENT DOCUMENTS

| | | | |
|---|---|---|---|
| 5,340,433 A | * | 8/1994 | Crump ............... B22F 3/115 118/202 |
| 6,164,753 A | | 12/2000 | Maza et al. |
| 9,085,109 B2 | | 7/2015 | Schmehl et al. |

(Continued)

*Primary Examiner* — Joseph S Del Sole
*Assistant Examiner* — Lawrence D. Hohenbrink, Jr.
(74) *Attorney, Agent, or Firm* — Bechen PLLC; Timothy J. Bechen

(57) ABSTRACT

An improved 3D printer includes an airflow enabled print bed ensuring secure placement of a print base prior to printing. The modular assembly technique provides for improved ease of manufacture and assembly, as well as adjustments of print sizing. The improved printhead includes a heat sink disposed internally therein for improved heat and cooling properties. The printhead itself includes z-axis position detection techniques. The inclusion of VSU insertion techniques in software modeling and printing further improves the print operations by including vertical stability for the print object.

15 Claims, 9 Drawing Sheets

(56) References Cited

U.S. PATENT DOCUMENTS

| | | | |
|---|---|---|---|
| 9,216,544 B2* | 12/2015 | Swanson | B29C 67/0059 |
| 9,314,970 B2 | 4/2016 | Elsworthy | |
| 9,481,133 B2 | 11/2016 | Carbone et al. | |
| 2013/0242317 A1* | 9/2013 | Leavitt | B29C 67/0055 |
| | | | 358/1.8 |
| 2019/0143592 A1* | 5/2019 | Burman | B33Y 30/00 |
| | | | 425/143 |

* cited by examiner

THREE-DIMENSIONAL PRINTER

RELATED APPLICATIONS

The present application is a continuation-in-part of and claims priority to U.S. patent application Ser. No. 15/659,433, filed Jul. 25, 2017, entitled "PRINTER HEAD Z-AXIS ALIGNMENT SYSTEM AND METHOD," the entirety of which is hereby incorporated by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The disclosed technology relates generally to three-dimensional printing and more specifically to improvements with a three-dimensional printing system and method.

BACKGROUND

Well known developments exist in three-dimensional (3D) printing technology. But with these developments, deficiencies still exist in the design of 3D printer systems, as well as 3D printing techniques.

For example, 3D printer assembly and printhead movements cause vibrations. Properly bracing the 3D printer provides long-term stability. In current designs, as the amount of bracing increases, so does the complexity of printer assembly. This complexity typically includes more cross bracing members, increasing assembly costs and time. The increased complexity also complicates varying the size of the 3D printer itself, where a larger print bed and larger printhead movement area requires more bracing.

Currently, many 3D printer assemblies are built using modular techniques failing to provide required long term stability and rigidity. For example, current techniques include building materials following the 80/20 Inc.® paradigm, modular connectable parts having limited points of contact, such as slotting mechanisms. These current techniques require different machining requirements for different printer sizes. Also, these current techniques are inadequate for bracing and stability, because of the high degree of movement and direction change of the 3D printhead. Thus, there is a need for an improved 3D printer assembly usable for varying printer sizes, as well as providing the required stability and rigidity for printing operations.

Another complication with 3D printers is removing the printed object. During printing, it is essential that the print bed or the printing object does not move, unless the 3D printer itself controls such movement. Once the print job is complete, problems arise with a print object sticking to the print bed. Current techniques require heating the print bed prior to printing, and then cooling the print bed before print object removal. Other techniques include using a magnetic print bed and a print base having magnetics therein, requiring a specialty-designed print base, adding to printing costs. There is a need for securing the print object during printing, but allowing the print object to be readily removeable once printing is complete, without adding significant printing costs.

The current printhead technology also suffers from print nozzle design limitations. In deposition printing, the deposition material must be heated to become liquefied. In this state, a nozzle then dispenses the material. Current nozzle designs use a heat sink within the head. These designs are cumbersome, adding unnecessary weight to the printhead. This weight also has repercussions in printing operations, including requiring more energy to move the printhead, as well as undue vibrations for these weighted movements. There is a need for improved printheads.

A further problem occurs in complicated 3D structures requiring internal bracing. Currently, there is no good way to make a print object isotropic. Printed objects formed by deposition of material suffer from anisotropic strength deficiencies in the Z axis versus the X and/or Y axis, caused by reduced strength between layers of the printed material. This limits geometries and applications for 3D printing.

One proposed solution is coating a filament with nanoparticles, and exposing the print to microwave radiation. While an effective technique, this adds additional printing and machining costs, and can be a difficult technique for accurate control. Another proposed solution is applying glue or solvent between layers, but this solution also requires expensive hardware to implement. Thus, there is a need for techniques for vertical strengthening of 3D printed objects.

BRIEF DESCRIPTION

An improved 3D printer includes a print bed having vacuum means for securing the print object to the bed. The vacuum provides airflow through holes in the print bed, securing the print object or a base onto which the object is printed. Upon print completion and termination of the vacuum force, the print object or print base onto which the object is printed, is easily removeable.

The improved 3D printer further includes a modular assembly technique for the printer housing. Printer housing manufacturing and assembly is improved by utilizing four panels with corner bracing members. Through utilization of pre-designated panel sizes, varying sized printer housings can be quickly manufactured and assembled. The corner bracing structure further improves durability and rigidity to ensure structural integrity during printing operations, as well as improve assembly time.

The improved 3D printer further includes a printhead assembly with z-axis position determination improvements. Further improvements include using a modular design printhead including a heat sink disposed within the printhead. The position of the heat sink improves printhead operations by reducing weight and improving heating efficiencies for deposition of print material.

The improved 3D printer further includes printing techniques for improved vertical stability. The printing technique includes methodologies for printing of exclusion points in print layers, as well as insertion of filament or other structural elements into the exclusion points. The 3D printing method therein prints around the filaments, embedding them between print layers and providing vertical stability previously unavailable.

A better understanding of the disclosed technology will be obtained from the following detailed description of the preferred embodiments taken in conjunction with the drawings and the attached claims.

DETAILED DESCRIPTION

Figure 1:
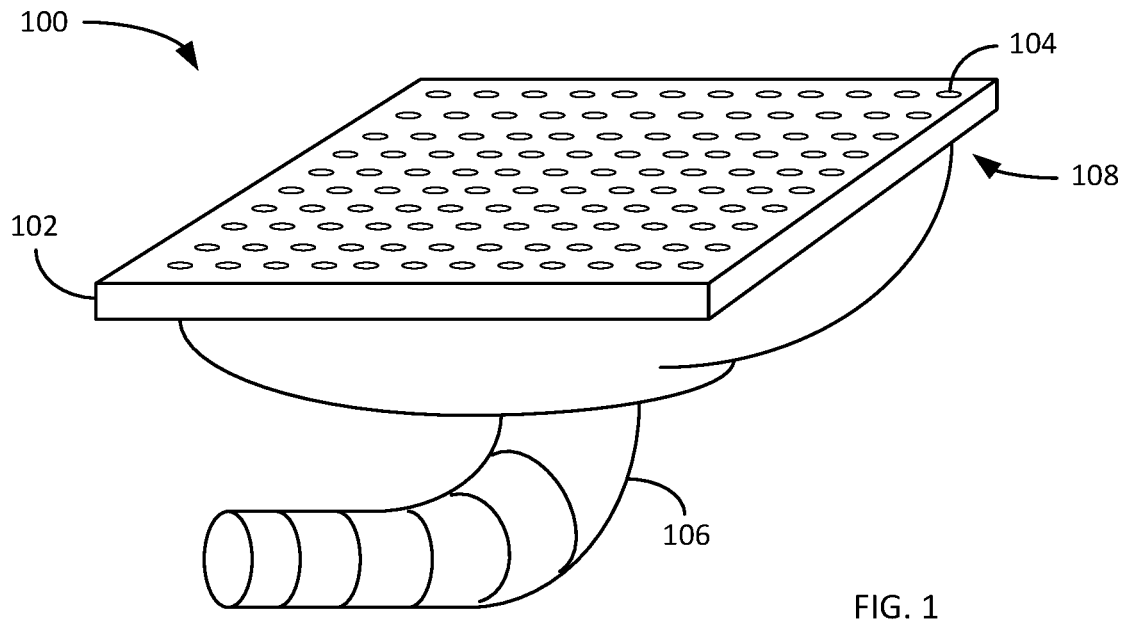
FIG. 1 illustrates a perspective view of one embodiment of a print bed.

FIG. 1 illustrates a perspective view of a print bed 100 providing for improved 3D printing. The print bed 100 includes a top layer 102 having a plurality of air holes 104 therein. A vacuum hose 106 is connected to a bottom layer 108.

The print bed 100 may be composed of any suitable material, such as but not limited to metal or plastic. The bed 100 allows for airflow through the holes 104. Varying embodiments allow for different sizing and placement of air holes, including one embodiment may include pin-prick size air holes, whereas other embodiments may include larger holes. The specific sizing of the air hole 104 is not limiting, such that the air hole 104 in combination with the air hose 106 provides for air flow therethrough.

While not directly illustrated, the air hose 106 connects to a vacuum or other type of air suction device. The vacuum may be any suitable type of device operative to pull air in through the air holes 104 and down the tube 106. In varying embodiments, the air holes are relatively small and can be any suitable size, such as, but not limited to, being ⅛" spaced on 1" centers. It is also recognized that in varying embodiments, the vacuum required is minimal, such as, but not limited to, 15 inches of mercury vacuum at 2-3 cubic feet per meter flow, as generated using one or more small pumps.

The print bed 100 is disposed within a 3D printer. The print bed 100 may replace current print beds presently available in 3D printers.

In one embodiment, the wiring of the vacuum (not illustrated) may be connected or integrated into the 3D printer itself, such that turning on the 3D printer thus turns on the vacuum. In another embodiment, the vacuum may include its own switch. Whereas in another embodiment, the vacuum may be separately electronically engaged by computerized controls, including engaging the vacuum at a time prior to beginning printing, for example after completing printhead position calibration operations.

Figure 2:
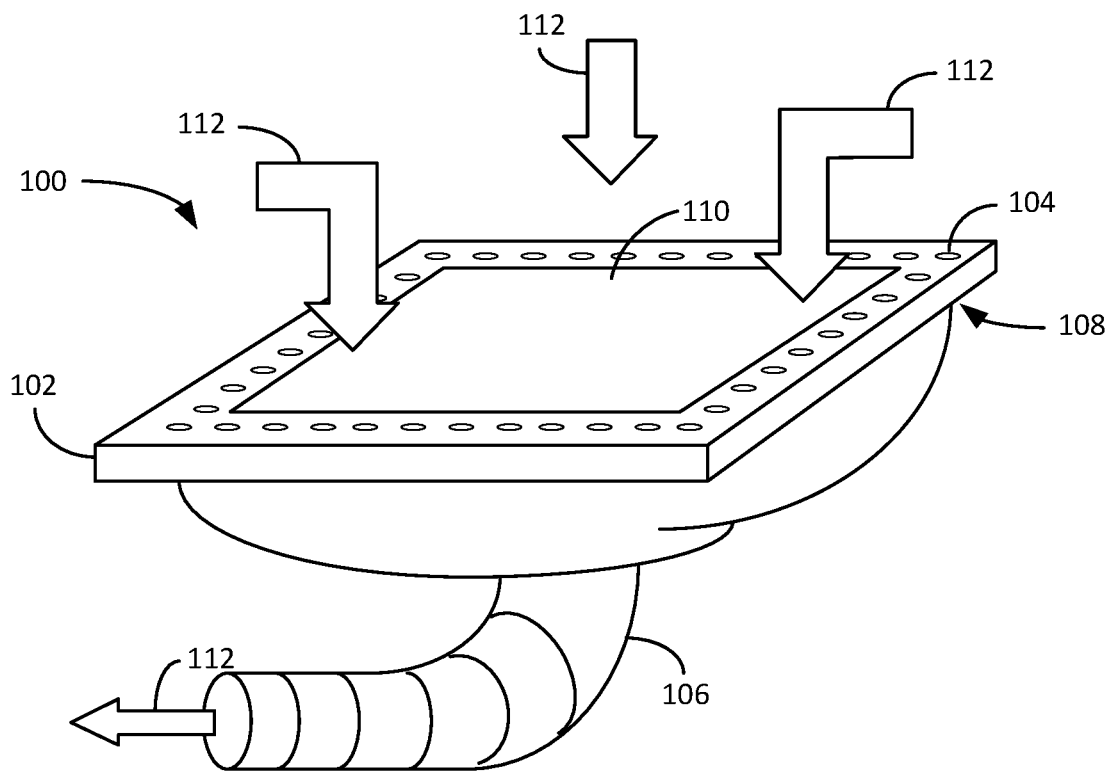
FIG. 2 illustrates a perspective view of one embodiment of a print bed having a print base thereon.

FIG. 2 illustrates one embodiment of the print bed 100 during printing operations. The print bed 100 includes the air holes 104 on the top layer 102, with the vacuum tube 106 extending out from the bottom layer 108. A print base 110 is placed on the top layer 102, covering a portion of the air holes 104. The arrows 112 illustrate air flow direction when the vacuum is engaged, pulling air through the air holes 104 out through the tube 106.

The print base 110 may be any suitable element having enough surface area, but limited mass, to be held in place by the vacuum-generated airflow 112. For example, the print base 110 may be a standard sheet of paper. In another example, the print base 110 may be paper having surface contact on a top side allowing for improved connection with deposited print material. In another embodiment, the print base 110 may be water-soluble, such that after printing operations, the print object and base 110 may be dipped in liquid to allow the paper to dissolve. The above examples are exemplary in nature and it is recognized that any other suitable type of print base 110 may be utilized, whereby the print base provides for being held in place by the airflow 112, but also receiving deposited print material, and being flexible or deformable to easy removal of the print object therefrom.

Engaging the vacuum during print operations holds the print base 110 in place by the airflow 112 while the 3D printer deposits material. When the print job is complete, the airflow 112 terminates, allowing for ease of removal of the print base 110 having the print job thereon.

In the embodiment of a water-soluble print base 110, the print job may be placed in water, allowing the print base 110 to simply dissolve. In other embodiments, the print job may be forcibly removed from the print base 110, such as by simply peeling off the base 110.

In previous 3D printers, problems can arise with the removal of the completed print job from the print bed. When printing is done directly on the print bed, dirt and other artifacts can affect the print job, as well as complicating separation of the print job from the print base upon print completion. Utilizing the airflow 112 secures the print base 110 for improved printing operations and print job extractions.

The vacuum print bed 100 further improves overall system efficiency by eliminating cooling times associated with print object removal. Prior print bed techniques require heating the bed prior to printing and cooling the bed for removing the print object. The vacuum print bed 100 secures the print base 110 and printing is done on the print base 110, thus eliminating heating and cooling cycles. For example, prior techniques may require an hour to heat the print bed, an hour for the print bed to cool for object removal, and then another hour to begin printing again. In this instance, the 3D printer itself is idle for three hours between print jobs. Whereas, the print bed 100 allows for instant removal of the print base 110 by disrupting the airflow 112 and then allowing for printing another object directly thereafter, eliminating unnecessary delay between print jobs. As used herein, a print job is any defined printing operation, such as but limited to: printing a portion of a print object where another print job completes or complements the print job;

printing a complete print object; printing multiple print objects or portions of print objects.

In another embodiment, the print bed 100 may include multiple zones, where air flow can be controlled on a per zone basis. For example, one embodiment may include a flap or shutter turning air flow off for one or more zones, but leaving air flow on for other zone(s). In this embodiment, the 3D printer may engage multiple print jobs on a common print bed, thus turning off a zone allowing for removing completed print jobs.

Current 3D printers additionally suffer from complicated framing assemblies. High accelerations of the printhead in all three axes requires high stiffness in the 3D printer frames.

Figure 3:
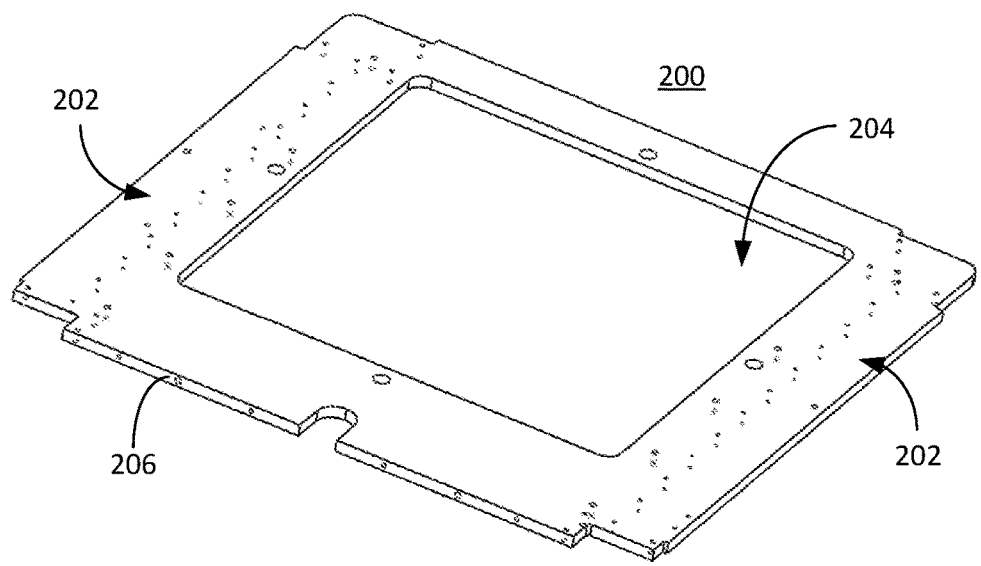
FIG. 3 illustrates a perspective view of one embodiment of a first 3D printer side component.

FIG. 3 illustrates an improved 3D printing assembly structure of a first panel 200 with apertures 202 and a center opening 204. The panel 200 further includes fastener holes 206 disposed along a side plane. The panel 200 may be made of any material having a high tensile strength providing rigid stability.

Figure 4:
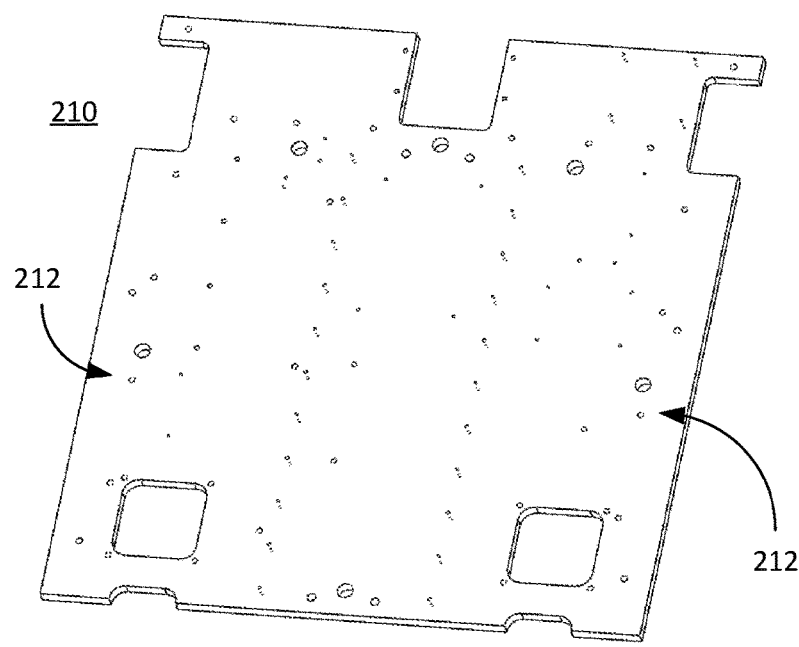
FIG. 4 illustrates a perspective view of one embodiment of a second 3D printer side component.

FIG. 4 illustrates another panel 210 of an improved 3D printing assembly, having apertures 212. Similar to the panel 200 of FIG. 3, this panel 210 may be made of any material having a high tensile strength providing rigid stability.

The panels 200 and 210 of FIGS. 3 and 4 may include any suitable number of apertures 202, 212 of varying sizes at varying locations. The general rigidity of panels 200 and 210 allow for improved stability in the 3D printer assembly, where placement of apertures allows for varying the size of the 3D printer, including larger or smaller print bed allowing for varying sizes of print jobs.

Figure 5:
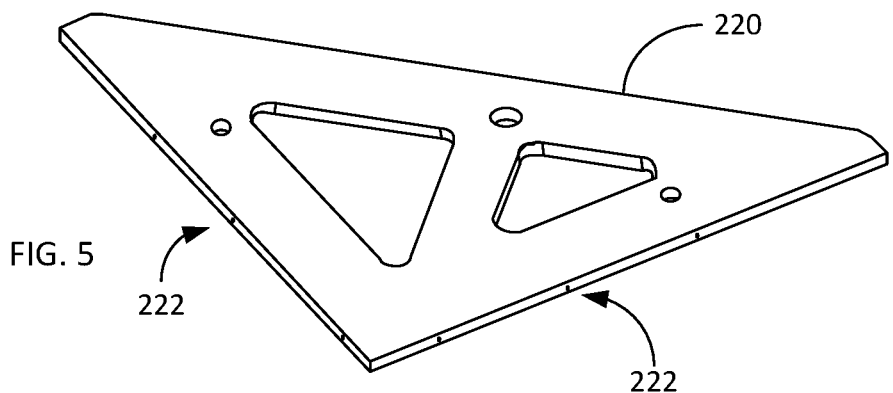
FIG. 5 illustrates a perspective view of one embodiment of another 3D printer bracing component.

In FIG. 5, a mating member 220 provides for mating panels 200 and 210 of FIGS. 3 and 4. The mating member 220 includes fastener holes 222 disposed along side edges. The mating member 220 may be made of similar material as panels 200 and 210. Moreover, in one embodiment, the panels 200, 210 and member 220 are composed of the same material to avoid manufacturing differences or structural differences brought upon by heat from the 3D printer or extended exposure to multi-axis movement forces by the 3D printer assembly. For example, in one embodiment the panels 200, 210 and member 220 are composed of thick aluminum sheets having a thickness between ½" and ¾".

Figure 6:
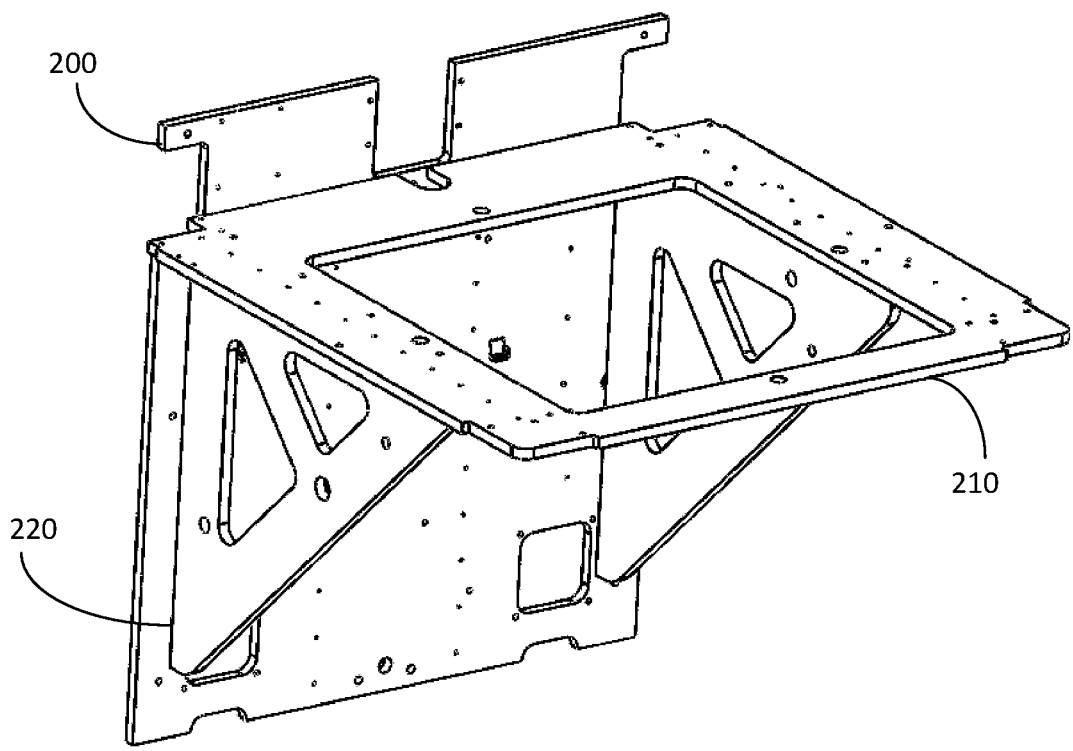
FIG. 6 illustrates a perspective view of one embodiment of assembly of 3D printer components.

FIG. 6 illustrates a perspective view of the mating of the panel 200 with panel 210, as secured by the mating member 220. Fasteners extend through the apertures 202 and 212, received into the fastener holes 222 of the mating member 220. Also securing the panels together, fasteners extend through the panel 210 into the holes 206 (not visible) of panel 200. The fastener holes 206, 222 may include internal grooves for holding the fasteners in place, whereas in other embodiment glue or other types of adhesive can be utilized. It is recognized that varying embodiments and fastening means may be utilized, as recognized by one skilled in the art, for securing the panels 200 and 210 to the member 220.

Figure 7:
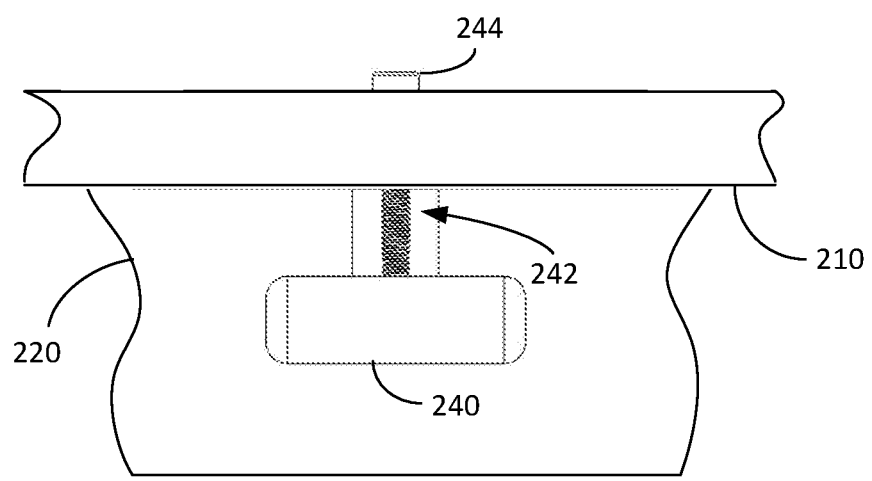
FIG. 7 illustrates a front view of one embodiment of a fastener assembly for mating pieces together.

Another embodiment for mating pieces together is to use a finger-slot attachment. FIG. 7 illustrates a front view illustrating one embodiment of this finger slot attachment. The plate 210 is positioned against member 220, the member 220 having a finger slot receiving portion 240. A fastener 244 is inserted through an aperture in the plate 210, with threads 242 engaging the receiving portion 240.

The finger slots remove the need to drill a hole through the ends of the plates, improving manufacturing and assembly efficiencies. Moreover, the finger slot allows for ease of construction by simply engaging the threaded portions 242 of the fastener 244 into the receiving portion 240 in the mating member 220.

As illustrated in FIG. 6, the assembly of the panels 200 and 210 can be readily adjusted for changes in the 3D printer sizing. The panels 200 and 210 include multiple rows of apertures as varying positions These panels 200, 210 and member 220 help define an outer structure for housing the 3D printer assembly. Where panel 200 includes the opening 206, panel 210 does not have an opening because z axis rails are mounted down the middle of the plate, where the z axis rails are described in further detail below. Thus, multiple panels 200, 210 are assembled and interconnected by members 220 to define the outer shell of the 3D printer, the outer shell having improved rigidity and stiffness for long term 3D printing without adverse effects of multi-axial vibrations from the movement of the printhead during printing operations.

Figure 8:
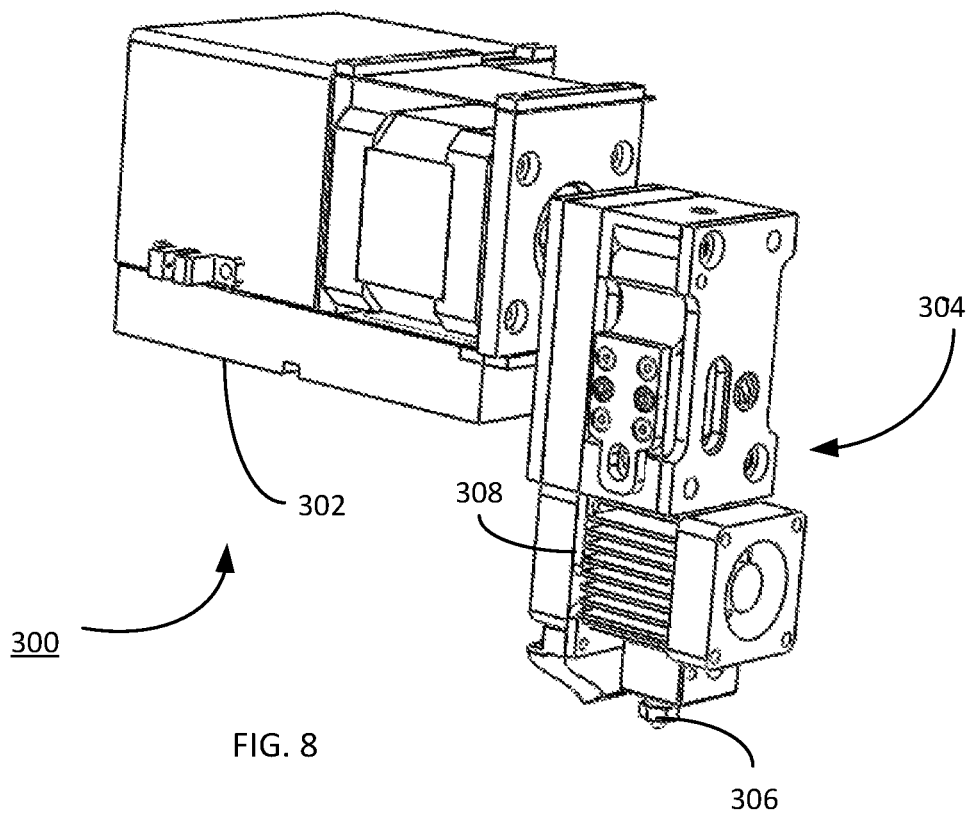
FIG. 8 illustrates a perspective view of one embodiment of a printhead.

A further improvement in the 3D printing is achieved by the functionality of the printhead for depositing print material. FIG. 8 illustrates one embodiment of an improved printhead 300.

FIG. 8 illustrates a perspective view of the 3D printhead 300 capable of using the position calibration functionality as described in U.S. patent application Ser. No. 15/659,433.

The printhead 300 includes a print module 302, also commonly referred to as a controller, and a hotend 304 with a deposition head 306 directly below a heat sink 308. The print module 302 controls operation of the hotend 304 and feeding filament (not shown) through the hotend 304. In accordance with known techniques, the hotend 304 heats deposition material using the heat sink 308, wherein the head 306 deposits the material for 3D printing.

In one embodiment, the hotend 304 may be the E3Dv6 hotend available from E3D-Online Lmtd, United Kingdom.

In another embodiment, the 3D printer utilizes an improved hotend disposed within the printhead. Where prior hotends provide for heating of the deposition filament and subsequent deposition, these prior hotends can suffer from complications arising from heat artifacts. High heat is required to melt the filament, current techniques can be inefficient not only from having to generate the initial heat, but maintaining the heat levels and dissipation of the heat into the 3D printer itself.

The improved hotend increases operational efficiency with many techniques, including having a heater element wrapped around a central tube, such as a copper tube. The improved hotend includes embedding the wrapped heating element and tube within a cavity disposed in a heat sink. For example, the wrapped heating element and tube may be disposed within a heat sink, such as heat sink 308 of FIGS. 8-9. Therein, this embedding of the wrapped heating element forces the retention of heat towards the tube and the heat sink 308 allows for efficient management and dissipation of the heat during and after print operations.

For installation and operation, the deposition head 306 therein attaches to the heat sink 308, providing for higher efficiency in deposition operations, including better management of heat generation, heat retention and subsequent heat dissipation of the hotend.

In one embodiment of the improved hotend, electronics for controlling the hotend, as well as printhead fans, are included in an electronics module placed directly on the printhead. The electronics module placement minimizes the signal path for analog control, as well as the amount of wiring going to the printhead.

In one embodiment, the hotend 304 uses an induction heating element to heat the deposition material, instead of a resistive element. Replacing the wrapped heating element with an induction heating element allows maintenance of the heating induction element using electronic controls already disposed on the print module 302. The induction heating element allows for high efficiencies and quicker temperature changes. Within the print module 302, control electronics produce a high frequency driving signal.

Here, using a heating element or induction element improves over other hotend printhead techniques including improving operational efficiency and lowering power requirements. By reducing the heating mass, the printer is able to warm-up and change temperatures much quicker. By inclusion of wiring from a controller disposed on the printhead, this reduces connection wires, including less chance of exterior wires getting broken or coming loose. Moreover, the utilization of a simple inner core or chamber for heating the filament simplifies the filament path, reducing any likelihood of the hotend jamming and disrupting print operations.

Generated heat must be dissipated quickly and efficiently to ensure the proper print material deposition and long-term integrity of the head 306.

Figure 9:
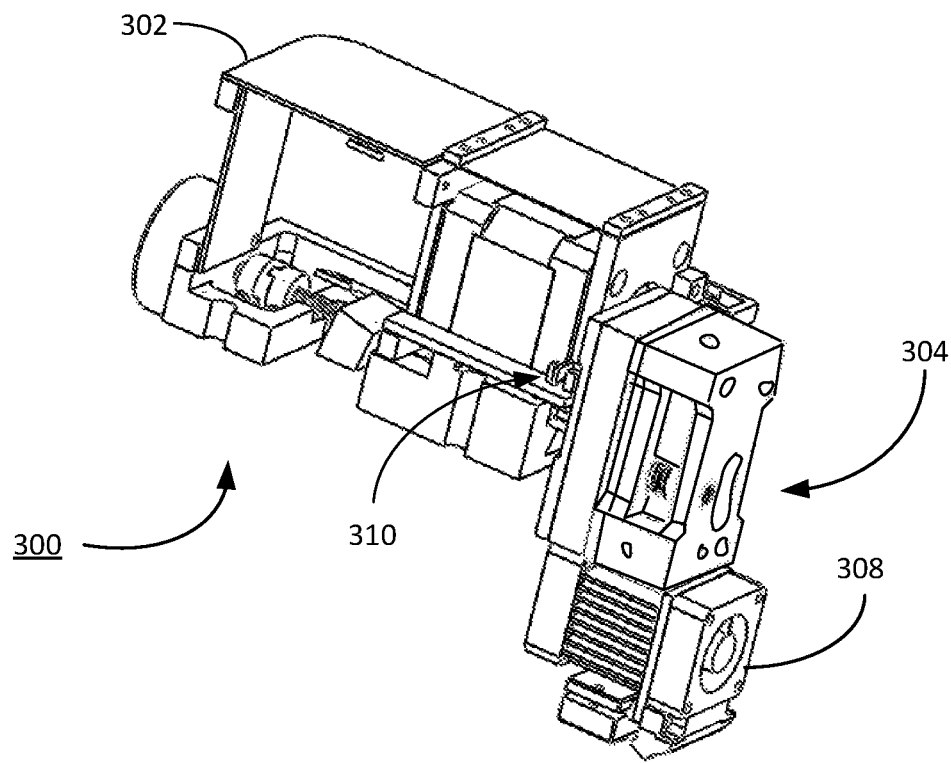
FIG. 9 illustrates another perspective view of the printhead of FIG. 8.

In FIG. 8, the z-axis displacement detection element is not visible. Whereas, FIG. 9 illustrates a different perspective view. The printhead 300 includes the hotend 304, heat sink 308 with the elements of the printhead 300. An optical sensor assembly 310 is disposed between the hotend 304 and the print module 302 for determining z-axis positioning.

Figure 10:
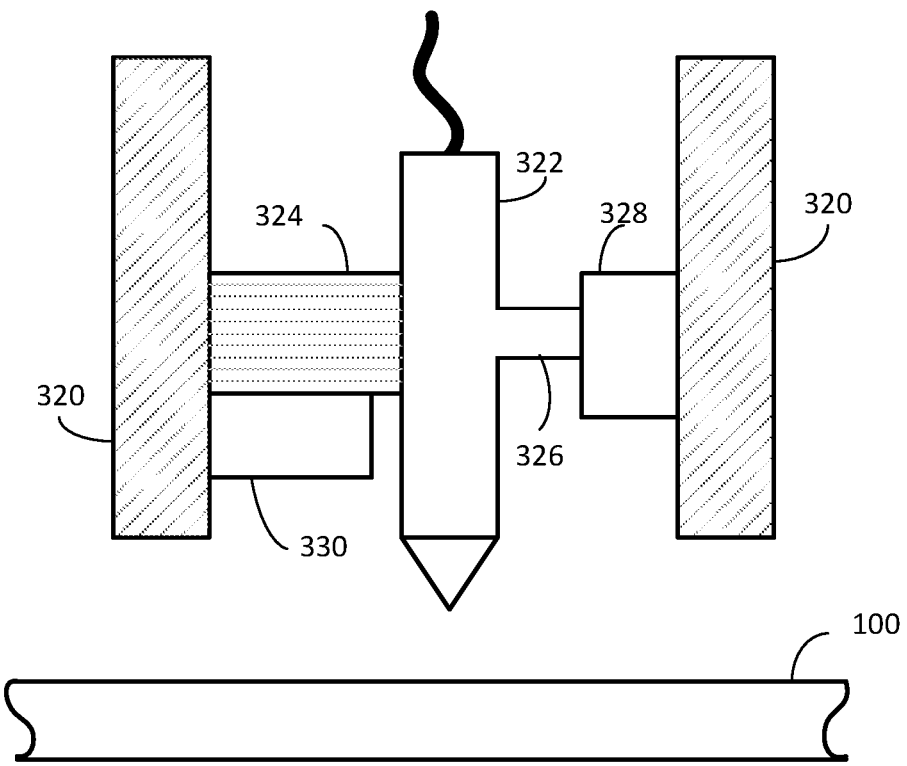
FIG. 10 illustrates a side view of one embodiment of a printhead within the calibration system.

FIG. 10 illustrates a front view of an assembly including a printhead 320, including a hotend 322 attached with a connector 324. The hotend 322 includes an arm 326 that extends outward from the hotend 322. The assembly also includes an optical sensor assembly 328, where the arm 326 extends therein.

The printhead 320 is positioned over the print bed 100, such as print bed 100 of FIG. 1. 3D printing is performed by the deposition of material onto the print bed 100 through the hotend 322 of the printhead 320.

While not readily visible, the optical sensor includes a light emitting source and a light detector. The emitting source is disposed on one side of the sensor assembly 328 and the detector on the other. During normal operations, the emitted light is occluded from the sensor by the arm 326. The arm 326 is positioned between the emitter and detector. Therefore, the optical detector does not register a change in light recognition. A preload stop 330 prevents downward movement of the connector 324.

In the above embodiment, the connector 324 may be a flexure assembly. The flexure has flexibility in the z-axis plane relative to the print bed 100.

Prior to beginning printing operations, the printhead 320 must determine a home position, with specific requirements to the z-axis position, dictating the spacing between the hotend 322 and the print bed 100.

While not readily visible, the optical sensor includes a light emitter and a light detector. The emitter is disposed on one side of the sensor assembly 328 and the detector on the other. Unless the hotend 322 is deflected as part of the calibration, the arm 326 partially blocks the emitted light from the detector. The arm 326 is positioned between the emitter and detector and the detector such that the detector receives a small amount of light.

In the above embodiment, the connector 324 may be a flexure assembly. The flexure is flexible in the z-axis plane relative to the print bed 330, and is stiff in the x and y axes. The connector 324 provides enough flexibility to ensure the hotend 322 can be displaced when the hotend 322 touches the print bed, but also have enough rigidity to ensure no unwanted movements during printing operations. For example, in one embodiment a stop member (not shown) connected to the printhead may preload a force against the connector 324 with enough force sufficient to prevent upward motion during normal printing operations, but small enough that the hotend 322 may be moved upward to trigger the sensing process without causing damage. The preload stop 330 engages the connector 324 at the point of contact between the connector 324 and the hotend 322. As the connector allows z-axis movement of the hotend 322, the stop 330 ensures the hotend 322 does not extend lower in the z-axis during the initialization phase, as well as during normal operations, but instead secures the proper z-axis position for the hotend 322.

Prior to beginning printing operations, the printhead 320 must determine a home position, with specific requirements to the z-axis position, dictating the spacing between the hotend 322 and the print bed 100.

Figure 11:
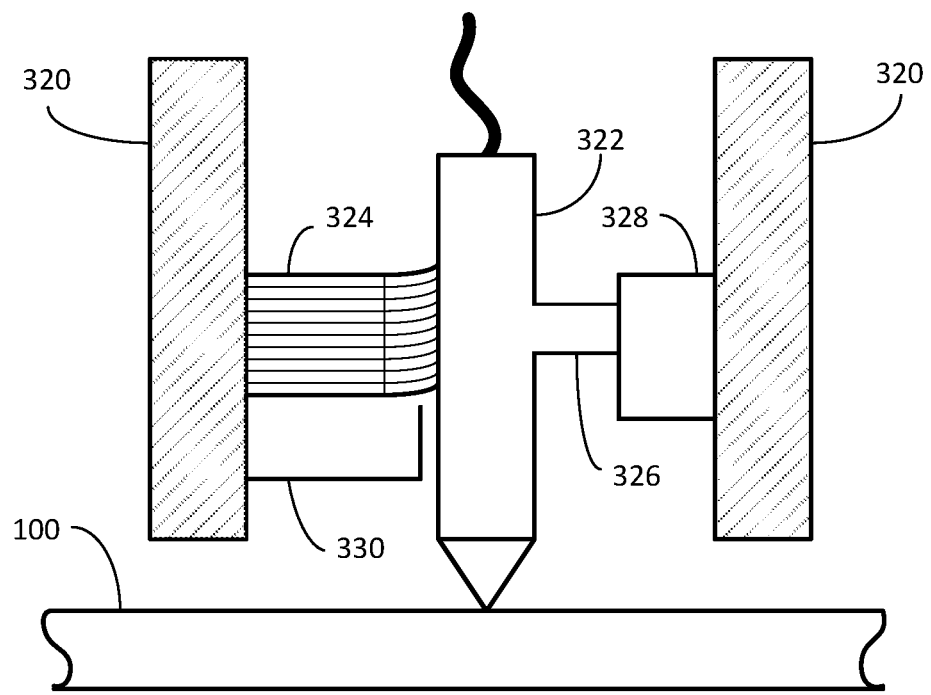
FIG. 11 illustrates a side view of one embodiment of the printhead with the hotend in contacting engagement with a print bed.

FIG. 11 illustrates printhead 320 movement for z-axis calibration. The 3D printer moves the printhead 320 and hotend 322 close to the print bed 100. When the hotend 322 engages the print bed 100, the printhead 320 is able continue moving in the z-axis direction, but the hotend 322 cannot because its movement is being resisted by the print bed 100. As the printhead 320 moves downward, the connector 324 absorbs the z-axis deflection without damaging the hotend 322.

The connector 324, in this embodiment being a flexure, flexes upward as the hotend 322 remains stationary relative to the print bed 100. As the optical sensor assembly 328 is affixed to the printhead 320, its position does not change relative to the printhead 320. Rather, as the movement of the hotend 322 is stopped by the print bed 100 and the printhead 320 (and sensor assembly 328) continue to move downward, the position of the arm 326 is displaced within the sensor assembly 328. As the arm 326 is within the sensor assembly 328, the change in position of the arm 326 relative to the assembly 328 allows for the arm 326 to increase the amount of light that passes from the emitter to the detector. Also visible, the connector 324 is no longer in contacting engagement with the stop 330.

The hotend displacement distance relates to the z-axis measurement precision. In one embodiment, the displacement distance is approximately 5 microns for determining z-axis position within a precision of 5 microns. The present technique for detecting change in voltage provides that even a very small change in the position of the arm 326 obstructing the light path causes a measurable change in voltage. As described in further detail below, the analog measurement of voltage change makes this detectable.

It is recognized that the above exemplary embodiment of 5 micron movement is not limiting in nature. The detector is partially occluded from the emitter by the arm 326 because full occlusion introduces distance error that may be unaccounted for. For example, if the light is fully occluded and the arm moves 10 microns with the light still occluded, those 10 microns of movement cannot be detected. Therefore, partial occlusion allows for an alignment position and the z-axis deflection reduces the amount of occlusion causing a change in light passing to the detector and thus a change in detector voltage. Moreover, it is recognized that the partial occlusion and change in light passing to the detector may also be a downward change in light, such that movement of the arm increases the amount of occlusion again creating a voltage change.

As used herein, axial movement is relative. In the example of z-axis movement, the movement of the printhead is relative to the print bed. For example, one embodiment may include print bed movement where the printhead is stationary. In another embodiment, the printhead may be moved and the print bed is stationary. It another embodiment, both the printhead and the print bed may be moved. Therefore, the herein described z-axis movement of the print bed is relative to the printhead and vice versa such that measurable z-axis displacement occurs and the z-axis movement is not expressly limited to solely moving the printhead.

Moreover, the z-axis position determination, further allows for self-leveling of the 3D printer system. For example, in a 3D printer system assembled using the modular connective outer structure described herein and the vacuum print bed can use the z-axis position detection to self-level prior to printing operations. For example, the 3D printer system can select three or more different X,Y axes print bed positions and determine Z axis depths for each position. From these Z axis positions, the 3D printer can thus self-level the printhead by defining the Z axis plane across the print bed.

The hotend 304 and nozzle 306 with the heat sink 308 disposed around thereby improves 3D printing operations. Further improvements are found by the placement of circuitry within the hotend 304 itself.

Figure 12:
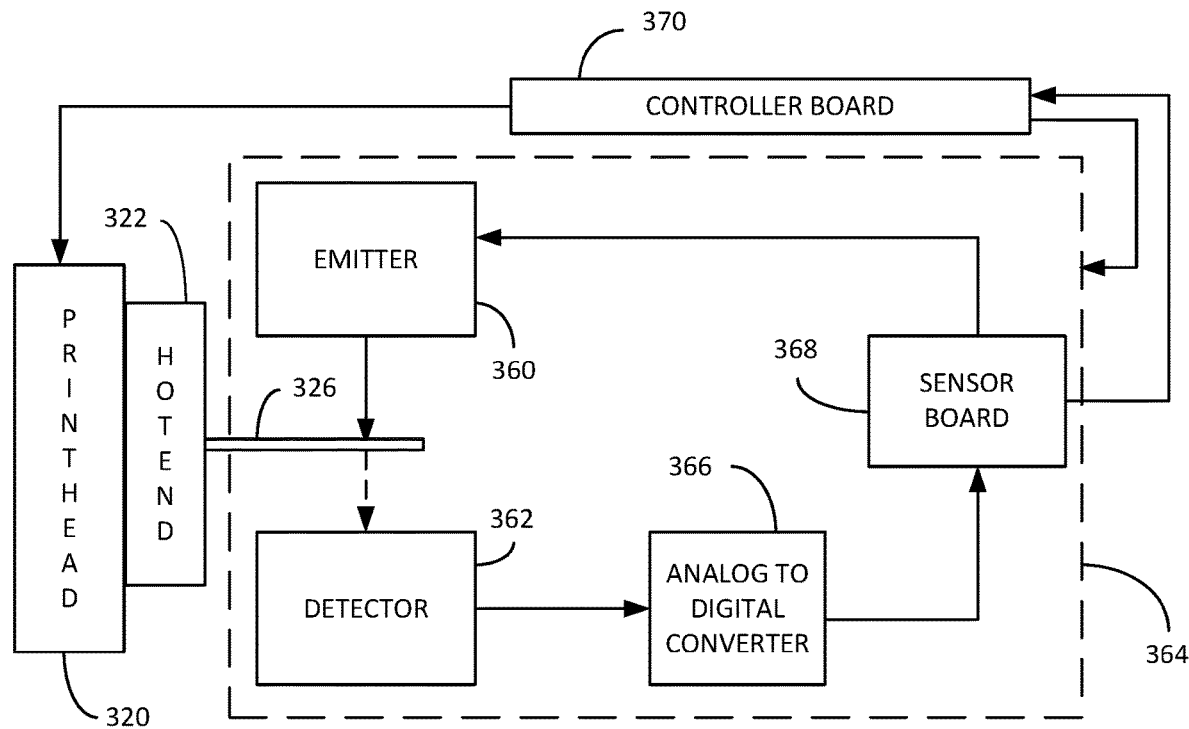
FIG. 12 illustrates a circuit diagram of one embodiment of controller.

FIG. 12 illustrates an operational diagram of the z-axis calibration, including an emitter 360 and a detector 362, which are part of an optical sensor assembly 364. The assembly 364 further includes an analog to digital converter 366 and a sensor board 368.

A controller board 370 controls positional operations for the printhead 320, thus also moving the hotend 322. Also shown for illustration of operational features, the arm 326 extends out from the hotend 322 between the light source 360 and sensor 362.

Illustrated in FIG. 12, two arrows extend between the emitter 360 and detector 362, indicating two operational stages: a first stage when the light is partially occluded by the arm 326; and a second stage when the arm 326 is displaced and increased light reaches the detector 362.

The emitter 360 may be any suitable type of light source capable of providing a directed beam of light. In one embodiment, the emitter is a light emitting diode consistent with known optical sensor technology, but it is recognized that any suitable light source may be utilized. Similarly, the detector 362 may be any suitable type of light sensor as recognized by one skilled in the art, where the light sensor generates an analog voltage output based on the amount of light detected.

It is recognized that any suitable electronic components may be utilized for performance of the operations described herein. By way of example, but not expressly limiting, the light may be an LED, disposed in a photointerrupter RPI-0352E available from Rohm Semiconductor.

As part of the improved 3D printer assembly, various print components are interchangeable. It is recognized that in deposition printing, it is not uncommon for the printhead to become clogged, or for controller mechanisms to need replacement. Modular integration of print components allows for reducing 3D printer downtime to swap out replacement components.

Modular construction and management of 3D printer components enhances the sequencing of multiple print job by overcoming malfunction errors. Where current 3D printers, when encountering an operational error, can require replacement of the full print assembly, modular construction allows for quick replacement of malfunctioning components. For instance, as illustrated in FIG. 8, a printhead 300 includes multiple components, modular construction separates out these components, as well as integration of the components into the 3D printer itself.

Figure 13:
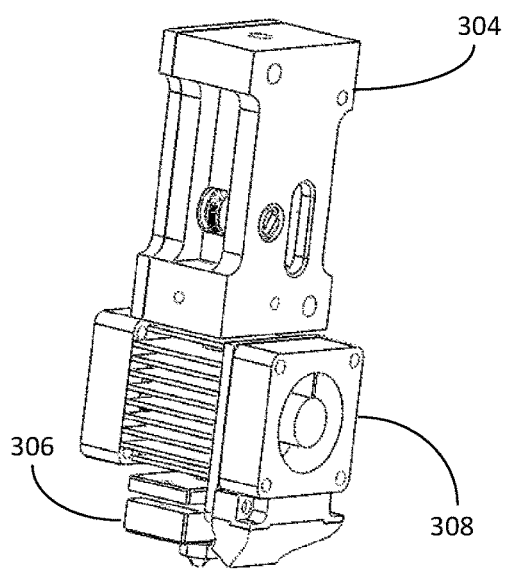
FIG. 13 illustrates one embodiment of modular hotend.

In the modular embodiment, FIG. 13 illustrates another view of the hotend 304, disengaged from the print module 302 of FIG. 8. The hotend 304 provides for deposition printing, including the heat sink 308 is disposed around the nozzle 306. The hotend 304 includes connector pads or elements (not expressly illustrated) that engage a print module and receive communication commands from the print module. During operations, the hotend 304 is connected to a controller, such as print module 302 of FIG. 8.

Figure 14:
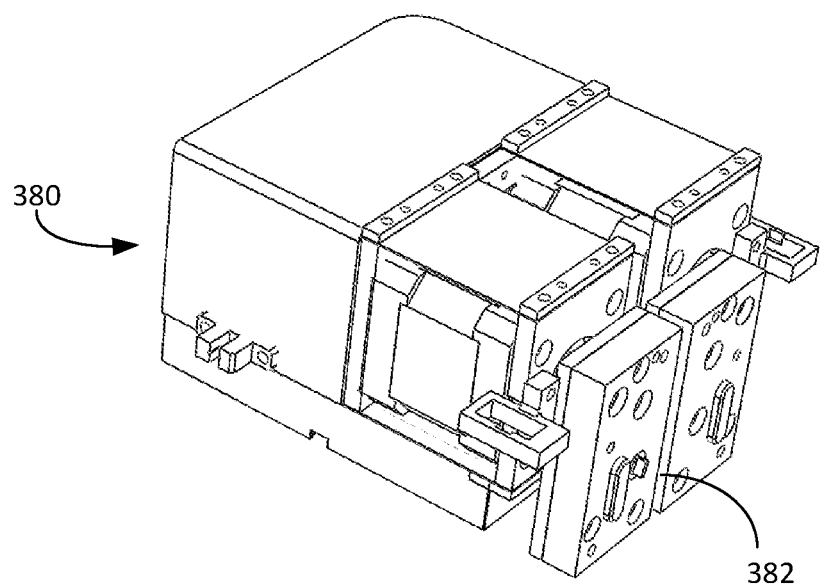
FIG. 14 illustrates one embodiment of modular controller.

FIG. 14 illustrates a print module 380 that includes connector pads 382 for contacting engagement with the printhead 304 of FIG. 13. The print module 380 is similar to the print module 302 of FIG. 8, but the print module 380 allows for connection of two hotends (e.g. 304 of FIG. 13). For example, multiple hotends may be used to deposit contrasting deposition materials.

The print module 380 includes functional components for controlling deposition of material by controlling the operation of the hotend 304 of FIG. 13 when connected. The hotend 304 of FIG. 13 connects to the print module 380 by being secured against the connector pads 382, such as via a magnetic fit, a pressure fit, or any other suitable means. During operations, the print module 380 controls the deposition of print material by the hotend 304 of FIG. 13. Moreover, it is recognized that any suitable type of printhead may be utilized, whereas the print module 380 is not expressly limited to the deposition-type printing illustrated herein.

Figure 15:
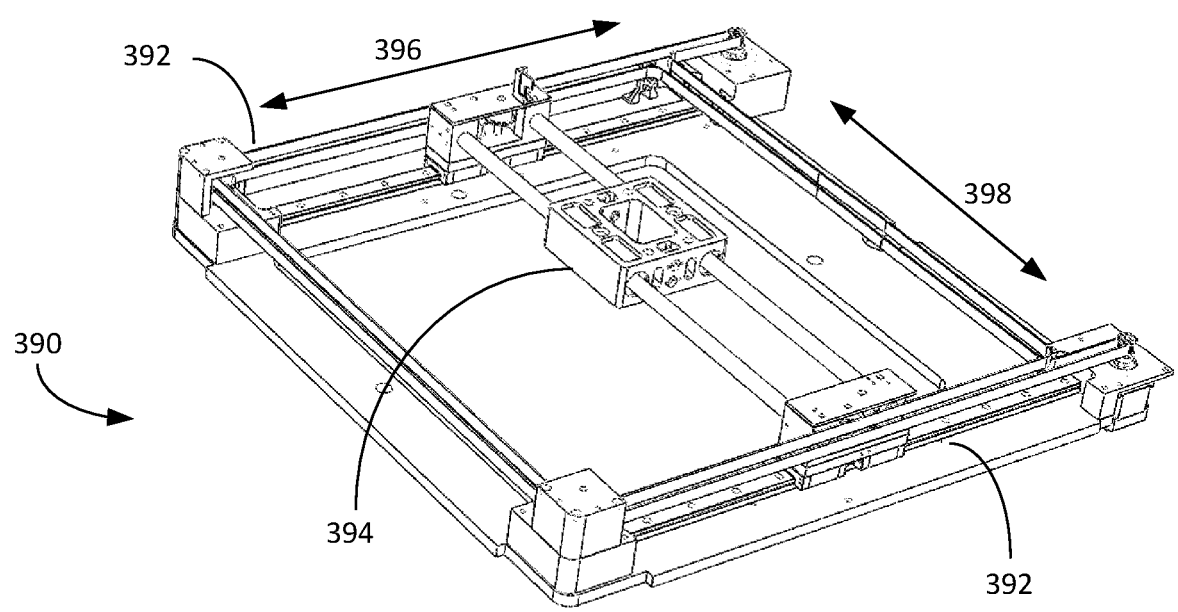
FIG. 15 illustrates one embodiment of an x-y position controller for a 3D printer assembly.

FIG. 15 illustrates a perspective view of the x-y axis printing control assembly 390. In this embodiment, control rails 392 move the block 394 in a first axis 396. Within the assembly 390, control mechanisms additionally move the block 394 in the second axis 398. For example, one embodiment may include cable or other means with rotary controls to control the first and second axis movement.

In the modular embodiment, the print module 380 of FIG. 14 can then be inserted into the block 394. The print module 380 (FIG. 14) is then moveable in multiple axes, with deposition via the hotend 304 (FIG. 13). Modularity allows for interchanging of components or elements without significant disruption of a print job, as well as overall print queue(s).

A further benefit of the present 3D printing system, including modularity of printing components, is the ability to automate not only individual printing operations, but also multiple printing operations. For example, the vacuum print base of FIGS. 1-2 allows for automated print job removal without disruption of other print jobs, such as by simply turning off the vacuum force for a segment of the print base allows for quick and easy print job removal. The assembly elements of FIGS. 3-7 allow for adjusting the size of the 3D printing system, allowing for large scale print jobs or multiple print jobs sharing the same print base. The printhead as described herein, including in FIGS. 8-9 allow for modular replacement of any malfunctioning components without requiring restarting any printing operations. The printhead self leveling and z-axis techniques allow for automated print job starting with secure knowledge of z-axis positions.

Therefore, the present 3D printing system can further function using an automated arm to manage print operations, such as placement of a print base 110 of FIG. 2 on the vacuum print bed, removing of print jobs once printing is completed and loading another print base 110 for a next job. In another embodiment, if a printhead component malfunctions during print operations, the same automation may replace printhead elements as necessary.

In operations with computational controllers, described herein, a robotic control mechanism can then automate multiple print jobs over an extended period of time without requiring human oversight and intervention. The vacuum print bed eliminates the long delay required to cool the print base for print job removal and reheating prior to beginning another print job. For example, the print bed may be segmented, so that vacuum air flow can be shut-off for a portion of the print bed, allowing for multiple print jobs to be executed, removing a single print job without disruption of the other print jobs. The improved printhead, including the improved hotend improves operational efficiencies allowing for extending 3D printing operations.

The automation of 3D printing techniques utilizes the core plate structure having one or more print beds attached thereto. The automated printing system may include, in one embodiment, one or more 3D printing assemblies attached into a rack to form the basis of an automated print cell. The automated print cell allows for the queuing of print jobs, thus printing multiple print jobs in succession without human intervention. The print core includes any combination of the structure elements, such as FIGS. 3-6, the print bed of FIGS. 1-2, modular printhead assembly of FIGS. 13-15, as well as other elements, providing for 3D printing.

In addition to the print cores, the automated print cell includes a storage area for storing finished prints, a loader area with new empty build plates, and a loader gantry arm that moves print jobs between these three areas. When a job completes in one of the cores, the loader comes over onto the build plate. Two parallel arms extend in to the build area and lower down onto the sheet on the vacuum table. At that point the build plate vacuum is turned off and an arm vacuum is turned on. The arm then lifts the sheet with the part attached, retracts and moves over to the storage area. It extends into an empty slot, the arm vacuum is turned off, and the sheet and part drop into its storage spot. The arm then retracts, moves over to the empty sheet area, captures a new blank sheet, e.g. print base, using the same technique, and takes it back to the print core. The printer starts the next print job and the cycle continues.

In addition to the automated print operations, the improved 3D printer further includes software modules and operations for performing the improved 3D printing. There are two primary software elements as part of the 3D printer system, relating to the flow of print job(s) and controller the print controller. One or more processing devices process the software in accordance with known processing techniques, wherein the processing devices may be disposed within the 3D printer itself, in an external controller or computing system, or distributed therebetween.

A further software technique relates to control operations of an automated 3D printing gantry for multiple print operations, including queuing of the print jobs, beginning of printing jobs and removal of print jobs from the 3D printer. For example, queuing of print jobs may be based on print operations, including filament types, colors, complexity, availability of print beds, prioritization of print jobs, operational printer malfunctions, print job completion times, per print job print costs etc. Thus, the queue may not necessarily be a strict first-in-first-out queue, but can include prioritization or optimization routines.

For print jobs operations, the software may include processing operations using known g-code file generation techniques. One embodiment may include insertion of meta-tags of other identifiers for the g-code file usable for sorting or queuing the print operations.

Figure 16:
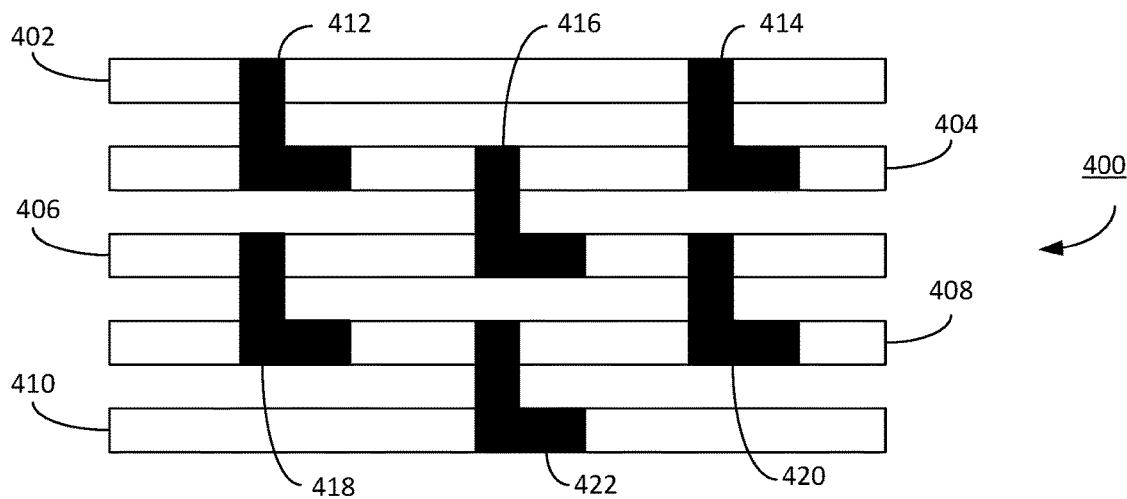
FIG. 16 illustrates a sample cross-section of a print object having inter-layer stability members inserted therein.

For complications relating to Z axis stability of a printed 3D object, FIG. 16 illustrates a vertical strengthening technique. FIG. 16 illustrates a cross-section of a 3D printed object 400, magnified showing the specific deposition layers 402, 404, 406, 408 and 410 (collectively referred to as layers 402-410). These layers are formed during print operations, representing a layer of material deposited by the 3D printhead.

In this deposition technique, FIG. 16 further illustrates the inclusion of vertical strength units (VSUs) 412, 414, 416, 418, 420 and 422 (collectively referred to as VSUs 412-422). The VSUs 412-422 are disposed between adjacent deposition layers 402-410, providing vertical stability. The VSUs are 412-422 are placed in holes left in the inner fill for the layer and when the next layer is printed, these VSUs 412-422 effectively fuse the adjacent layers 402-410 together.

The VSUs 412-422 may be made of any suitable material allowing for rigidity between the layers 402-410. By way of example, but not expressly limiting in nature, the VSUs 412-422 may be made of plastic filament deposited into predetermined locations.

In one embodiment, the VSU is just a bit of the same plastic as in the rest of the 3D print object. Wherein, for the VSU, extrusion of deposition material occurs as the printhead moves vertically (in the Z axis) instead of horizontally (in the X and/or Y axis). The main strength of the filament occurs in the extrusion direction. Thus, the VSUs provide concentrated points where the filament travels vertically, providing a significant strengthening point for the overall structure.

Figure 17:
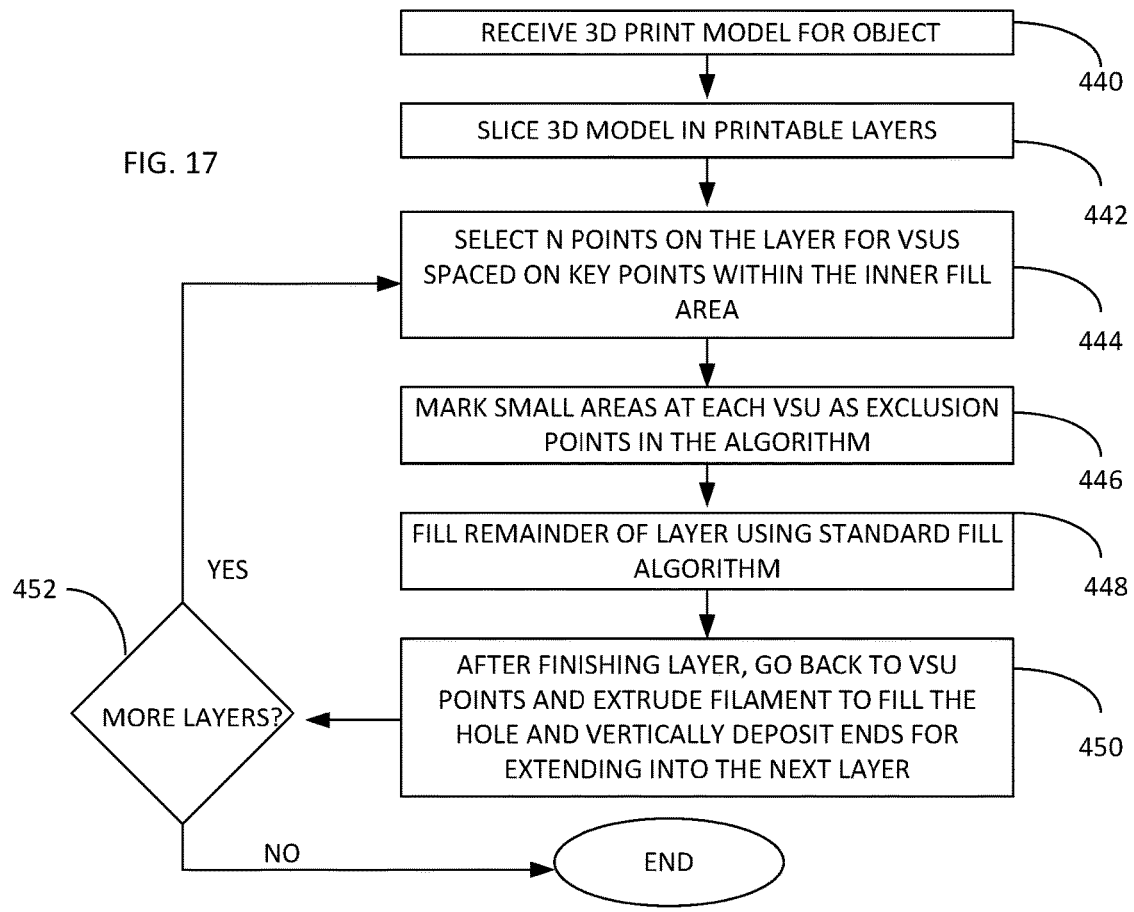
FIG. 17 illustrates a flow diagram of one embodiment of a technique for insertion of inter-layer stability members.

FIG. 17 illustrates a flowchart of the steps of one embodiment of a method for modification of a print object for inclusion of VSUs. Step 440 is to receive a 3D model of the print object, consistent with known 3D printing techniques. Step 442 is to slice the 3D model into layers, consistent with known printing techniques.

Step 444 is to selecting N number of points on a print layer for inclusion of VSUs, where N is any suitable integer value. The VSUs are disposed at key points of layer within the inner fill area. Determining these key points may be electronically determined using a computerized algorithm or can be determined manually by a user, such as a user managing the print job. The VSUs are denoted in the g-code file as exclusion points, cavities or empty areas to be avoiding during the layer deposition.

Step 446 is marking small areas at each VSU as exclusion points in the printing algorithm. Step 448 of the technique is filling the remaining of the layer using a standard fill algorithm.

In step 450, after finishing the rest of the layer, go back to the VSU print and extrude filament to fill the hole and then vertical slightly to produce nubs extending into the next layer.

For 3D object printing, the object has numerous layers, thus step 452 is determining if more layers are to be printed. If yes, the technique reverts back to step 444 and repeats, printing the additional layer with vertical supports. If no, the present technique is therefore concluded.

Therein, the present technique improves vertical stability for print objects by modification to the printing routine. In one embodiment, the vertical stability modification is a software solution to existing printing software technology, by inclusion of VSU exclusion points in the print modeling.

During modeling, these exclusion points are added for printing operations, whereby the printhead additionally includes filament members for stability.

Accordingly, improved techniques providing for improved 3D printing as described herein. The air flow enabled print bed ensures secure placement of the object prior to print completion. The modular assembly technique provides for improved easy of manufacture and assembly, as well as adjustments of print sizing. The improved printhead includes a heat sink disposed internally therein for improved heat and cooling properties. The printhead itself includes z-axis position detection techniques. The inclusion of VSU insertion techniques in software modeling and printing further improves the print operations by including vertical stability for the print object. Moreover, inclusion of an automated print control operation and software for print job queuing, prioritization, allows for multiple print jobs to be executed in consecutive fashion, without human oversight.

FIGS. 1 through 17 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A 3D printer comprising:
a print bed having a plurality of air holes disposed therein, the air holes being circular in shape and disposed in at least one of a first zone of the print bed and a second zone of the print bed;
a print base affixable to the first zone of the print bed, the print base affixable over at least a portion of the air holes in the first zone;
a vacuum disposed beneath the print bed generating an airflow into the first zone of the print bed and the second zone of the print bed, the vacuum generating the airflow for securing the print base to the first zone of the print bed by allowing airflow through the air holes into the vacuum therebelow, the vacuum including at least one shutter for controlling the airflow to the first zone of the print bed and the second zone of the print bed;
a 3D printer printhead depositing deposition material on a top portion of the print base secured to the first zone of the print bed by the airflow generated from the vacuum; and
a z-axis detection system disposed within the 3D printer printhead, such that the printhead is operative to self level itself using the z-axis detection system;
wherein movement of the at least one shutter disrupts the airflow to the first zone of the print bed, allowing for removal of the print base from the first zone of the print bed upon completion of deposition by the 3D printer printhead;
wherein the print base is made of a deformable material and after removal from the first zone of the print bed, the deposition material is removeable therefrom;
wherein the z-axis detection system includes:
a controller determining a zero position of the 3D printer printhead in an x-axis and a y-axis, as well as finding an initial position for position of the printhead in the z-axis;
a hotend of the 3D printer printhead for deposition of the deposition material, the hotend connected to the 3D printer printhead via a connector moveable in the z-axis, the hotend including an arm extending outward therefrom;
an optical sensor assembly including an emitter and a detector, the optical sensor assembly directly affixed to the 3D printer printhead, where at the initial position in the z-axis, the arm of the hotend extends in-between the emitter and the detector; and
wherein the controller calibrates a starting position for the 3D printer printhead based on z-axis movement of the printhead distinct from the hotend as facilitated by the connector, causing z-axis displacement of the arm on the hotend, the z-axis displacement allowing the detector to detect a change in light from the emitter.

2. The 3D printer of claim 1, wherein the printhead includes a modular printhead.

3. The 3D printer of claim 1 further comprising:
control operations associated with the printhead for depositing filament in a z-axis direction engaging a plurality of deposition layers in a y-axis and an x-axis.

4. The 3D printer of claim 1 further comprising:
a controller for managing print job operations.

5. The 3D printer of claim 1 further comprising:
a third zone of the print bed; and
a plurality of shutters for independently controlling airflow within the first zone of the print bed, the second zone of the print bed, and the third zone of the print bed.

6. The 3D printer of claim 1, wherein the connector is at least one of: a flexure assembly and a linear rail including a spring element.

7. The 3D printer of claim 1, wherein the starting position between the 3D printer printhead and a print bed is known within a distance of less than 10 microns.

8. The 3D printer of claim 1, wherein the z-axis movement of the 3D printer printhead is at least one of: movement of the 3D printer printhead while a print bed is stationary; and movement of the print bed while the 3D printer printhead is stationary.

9. A 3D printer comprising:
a print bed having a plurality of air holes disposed therein, the air holes being circular in shape and disposed in at least one of a first zone of the print bed and a second zone of the print bed;

a print base affixable to the first zone of the print bed, the print base affixable over at least a portion of the air holes in the first zone;

a vacuum disposed beneath the print bed generating an airflow into the first zone of the print bed and the second zone of the print bed, the vacuum generating the airflow for securing the print base to the first zone of the print bed by allowing airflow through the air holes into the vacuum therebelow, the vacuum including at least one shutter for controlling the airflow to the first zone of the print bed and the second zone of the print bed;

a 3D printer printhead depositing deposition material on a top portion of the print base secured to the first zone of the print bed by the airflow generated from the vacuum; and a z-axis detection system disposed within the 3D printer printhead, such that the printhead is operative to self level itself using the z-axis detection system;

wherein movement of the at least one shutter disrupts the airflow to the first zone of the print bed, allowing for removal of the print base from the first zone of the print bed upon completion of deposition by the 3D printer printhead;

wherein the print base is made of a deformable material and after removal from the first zone of the print bed, the deposition material is removeable therefrom;

wherein the z-axis detection system includes:

a controller controlling movement of the 3D printer printhead moveable in a first axis;

a hotend of the 3D printer printhead for depositing the deposition material, the hotend connected to the 3D printer printhead via a connector moveable in the first axis, the hotend including an arm extending outward therefrom;

an optical sensor assembly including an emitter and a detector, the optical sensor assembly affixed to the 3D printer printhead; and wherein the controller calibrates a starting position for the 3D printer printhead based on first axis movement of the printhead relative to a print bed, the first axis movement distinct from the hotend as facilitated by the connector and detected by the arm interacting with the optical sensor assembly.

10. The 3D printer of claim 9, wherein the printhead is a deposition printhead.

11. The 3D printer of claim 9, wherein movement in the first axis is movement in the z-axis plane of movement.

12. The 3D printer of claim 9, wherein the connector is a flexure assembly.

13. The 3D printer of claim 9, wherein the connector is a linear rail including a spring element.

14. The 3D printer of claim 9, wherein the interaction of the arm with the optical sensor assembly includes the arm partially occluding a light from the emitter prior to the first axis movement of the 3D printer printhead distinct from the hotend with the arm being displaced by the first axis movement of the 3D printer printhead distinct from hotend such that the detector detects a change in the light.

15. The 3D printer of claim 14 further comprising:

a sensor board instructing the controller that the detector in the optical sensor assembly detects the light, wherein the sensor is disposed on the 3D printer printhead.

* * * * *